United States Patent Office
3,428,706
Patented Feb. 18, 1969

3,428,706
COMPOSITIONS COMPRISING ACID-CATA-
LYZED AND ALKALINE-CATALYZED
ORGANOPOLYSILOXANES
Amy L. Jasinski, Toledo, and Judith A. Walmsley, Sylvania, Ohio, assignors to Owens-Illinois, Inc., a corporation of Ohio
No Drawing. Filed Sept. 20, 1966, Ser. No. 580,581
U.S. Cl. 260—825                                9 Claims
Int. Cl. C08g 47/02

The present invention relates to a composition comprising a solid acid-catalyzed organopolysiloxane that is prepared principally from trifunctional trialkoxy silanes such as methyltriethoxy silane and as a modifier therefor an alkaline-catalyzed prepolymer or solid ladder-type polymer prepared from propyltrialkoxy silane.

In the past, hard solid organopolysiloxanes in the form of castings and films have been prepared from trifunctional, trialkoxy silanes such as methyltriethoxy silane, but the commercial use of such organopolysiloxanes particularly in the form of films and coatings have suffered from the drawback that they do not have a proper balance of properties including hardness, heat resistance, chemical resistance and flexibility that is required for many industrial coatings. It is therefore desirable to produce hard, heat resistant and chemically resistant coatings and films from organopolysiloxanes prepared from trifunctional precursors, such coatings and films generally having some flexibility.

It is an object of the present invention to provide an organopolysiloxane composition that is adapted to form films, coatings and discs that are hard and have excellent heat and chemical resistance.

It is an object of the present invention to provide a composition that is a mixture of an acid-catalyzed conjoint hydrolysis and condensation product from a trialkoxy silane and an alkaline-catalyzed conjoint hydrolysis and condensation product of propyltrialkoxy silane.

It is an object of the present invention to provide hard, heat stable and chemical resistant compositions such as coatings from a mixture of (1) an acid-catalyzed organopolysiloxane prepared from a hydrocarbon trialkoxy silane such as methyltrialkoxy silane and (2) an alkaline-catalyzed organopolysiloxane that is an autogenous condensation product of propyltrialkoxy silane.

These and other objects will be apparent from the specification that follows and the appended claims.

The present invention provides a composition that has an unusually fine balance of properties including acetone resistance, heat resistance and some flexibility. The composition comprises (1) an acid-catalyzed organopolysiloxane that is a conjoint hydrolysis and condensation product of a trialkoxy silane that is preferably methyltriethoxy silane or a mixture thereof with phenyltriethoxy silane and (2) an alkaline-catalyzed condensation product of propyltrialkoxy silane.

The compositions containing the outstanding balance of properties can be made using an alkaline-catalyzed prepolymer or polymer of propyltrialkoxy silane in amounts of about ½ to 300 parts by weight per 100 parts by weight of the acid-catalyzed polymer. For solid compositions such as discs and cubes, the amount of alkaline-catalyzed polymer generally used in about ½ to 5 parts and preferably 1 to 2 parts by weight. When coatings and films are made, the amount of alkaline-catalyzed polymer is about 1 to 100 parts by weight and preferably about 33 to 50 parts by weight per 100 parts by weight of the acid-catalyzed polymer.

The alkaline-catalyzed polymer can be in the form of a prepolymer or polymer and its physical state can be liquid or powder. Likewise, the acid-catalyzed polymer can be used in a liquid form or a powder form. As will be hereinafter described in greater detail, the starting acid-catalyzed polymer is generally in the form of a thick, viscous solution of a prepolymer in a solvent such as ethanol and butanol or a powdery solid capable of being heat cured to a thermoset polymer.

In preparing the acid-catalyzed polymer of methyltrialkoxy silane or a mixture of methyl and phenyl trialkoxy silanes, a partial condensation product is first prepared from which a precured and finally a cured product is obtained.

The process of forming a solid heat softenable acid-catalyzed polymer from methyltriethoxy silane or a mixture thereof with phenyltriethoxy silane in the form of a powder or a solution in ethanol comprises the steps of
I. Heating a mixture of
(A) Silanes which are methyltrialkoxy silane, or ethyltrialkoxy silane, or mixtures of methyltrialkoxy silane and phenyltrialkoxy silane; and in which silanes the alkoxy group contains from 1 to 6 carbon atoms,
(B) At least a trace of acid and at least about 1.5 moles of water for every mole of total silane present, at a temperature of from about 50° to about 80° C. for a period of time of from about 1 to about 10 hours;
II. Concentrating the liquid siloxane partial condensation product from step I to remove some but not all volatile material including alkanol by-product and some water and to obtain a liquid residue;
III. Precuring the product of step II at a temperature of from about 10° to about 20° C. below the gel point of the resin for a period of time of from about 1 second to about 60 minutes; and
IV. Solidifying the product of step III to obtain a heat softenable solvent acid-catalyzed organopolysiloxane that is capable of being further cured to a thermoset resin.

It is preferred that the process of preparing the acid-catalyzed polymer comprises:
I. Heating a mixture of
(A) From about 1 to about 5 moles of methyltriethoxy silane or a compound represented by Formula I and from about 5 to about 1 mole of a compound as represented by Formula II

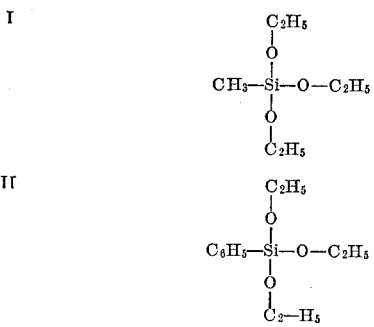

wherein $C_6H_5$ is phenyl,
(B) From about 1.5 to about 3 moles of water for every mole of total silane present in the compounds as represented by Formulae I and II, there being less than 0.01 mole of acid present in the reaction mixture per mole of said silane introduced thereto at a temperature of about 80° C. for a period of time of from about 2 to about 6 hours;
II. Concentrating the liquid siloxane partial condensation product from step I by distilling at the reaction temperature until approximately 80 percent of the theoretical yield of ethanol is removed, thereby to remove some but not all volatile material including alkanol by-product and some water and to obtain a liquid residue;
III. Precuring the product of step II by heating slowly to a temperature of from about 10° to about 20° C. below the gel point of the resin and holding this temperature momentarily; and IV. Solidifying the product of step III by cooling to obtain a heat softenable solvent soluble organopolysiloxane that is capable of being further cured to a thermoset resin.

As previously mentioned, the precured polymer product of step III can also be used as the starting acid-catalyzed material.

As to the alkaline catalyzed propyltrialkoxy silane polymer component, an organopolysiloxane prepolymer is first prepared by conjointly hydrolyzing and condensing, to form a siloxane partial condensation product, a hydrolyzable propyltrialkoxy silane in which the alkoxy group has from 1 to 6 carbon atoms. This reaction is effected under alkaline conditions, i.e., at a pH above 7.0, more particularly at a pH of at least 9, preferably from 10 to 14, and still more preferably at a pH of about 12–13.

Theoretically any compound that will provide an alkaline (basic) solution should be effective as a catalyst in promoting the alkaline-catalyzed siloxane condensation reaction. Practically, however, some basic or basic-forming materials are much less satisfactory or less effective than others, requiring longer reaction periods, or special "work-up" procedures in isolating the product, or special techniques or a different added basic catalyst in polymerizing the prepolymer, or yielding a different type or a less useful product than that which is desired for the usual commercial applications. For example, ammonium hydroxide, aqueous solutions of normally gaseous amines, e.g. monomethylamine, and low-boiling basic compounds such as dimethylamine and monoethylamine have the objection that much of it may be lost by volatilization when the conjoint hydrolysis and condensation reaction is effected by the preferred technique of heating the alkaline-catalyzed reaction mass under reflux.

It is preferred to use as the basic catalytic material a hydroxide, carbonate or bicarbonate of an alkali metal having an atomic number above 3. The basic catalyst is preferably introduced as such into the reaction mixture but it is not essential that this be done since it may be formed in situ. Alkali-metal alkoxides may be employed, e.g. sodium, potassium, rubidium and cesium methoxides, ethoxides, n-propoxides and tert.-butoxides.

A catalytic amount of the basic or basic-forming reagent is present in the reaction mass both for the initial conjoint hydrolysis and condensation reaction and during the subsequent heat-treatment of the siloxane partial condensation product or prepolymer. An additional amount of the same catalyst or a different catalyst may be incorporated into the prepolymer, as desired or as conditions may require, prior to the aforementioned heat-treatment.

The amount of the catalytic base that is added to the initial reaction mixture is sufficient to effect an autogenous condensation of the hydrolyzable silane, e.g., a tration not less than $1.0 \times 10^{-4}$ M (molar). Thus, using KOH at a concentration of $1.0 \times 10^{-2}$ M, one obtains a solid prepolymer.

The reaction of the trialkoxy silane with water in the presence of a base may be carried out in the presence or absence of an organic solvent, e.g., a lower alkanol, and specifically methanol. Methanol has been found to be the most satisfactory solvent regardless of the alkoxy groups in the silane. However, other alcohols, such as ethyl, propyl, isopropyl alcohols or higher members of the homologous series, may be used if desired. Other organic solvents that may be employed are water- and/or alcohol-soluble solvents that will form a single-phase system upon initial admixture of the various ingredients, e.g., acetone.

The conjoint hydrolysis and condensation reaction is effected at an elevated temperature, usually at the refluxing temperature of the reaction mass. The time of the reaction under reflux conditions may vary considerably, e.g., from 1 to 120 hours, but generally the desired prepolymer is obtained after a reaction period under refluxing conditions of from 2 to 96 hours.

The resulting siloxane partial condensation product or prepolymer is isolated by any suitable means. For example, a solid siloxane prepolymer may be separated by suction filtration, washed thoroughly with a solvent in which it is insoluble, and in which water and the base are soluble, e.g., methanol, and dried in air and/or under heat until substantially all the methanol has been evolved. Thus, a combination of air-drying followed by drying in a vacuum oven at 20° to 50° C. for from 2 to 4 hours or longer advantageously may be employed.

The solid prepolymer obtained as above described is then heated to a temperature not substantially exceeding its melting point in order to advance its condensation to the desired film-forming organopolysiloxane. For example, a prepolymer obtained by conjoint hydrolysis and condensation of a propyltrimethoxy silane, specifically n-propyltrimethoxy silane, may be heated (preferably under vacuum) to its melting temperature of about 300° C. in order to advance its condensation to the desired film-forming organopolysiloxane. Heating under vacuum removes oxygen that causes or tends to cause decomposition of the heated polymer at such high temperatures; and, also, aids in the removal of volatile, low-molecular-weight materials from the melt. In the case of oily condensation products, vacuum treatment under heat is carried out at a temperature and for a period of time sufficient to remove at least the excess and/or by-product alcohol and to remove any low-boiling polymeric material.

After heating in this manner, the polymer is then cooled, also preferably under vacuum, to ambient temperature. Cooling under vacuum may be effected at approximately the same reduced pressure used in heating the solid organopolysiloxane to its melting temperature thereby to obviate or minimize discoloration of the product. The vacuum applied during the aforementioned heating and cooling steps may correspond to, for example, 1 or 2 mm. Hg, or lower or higher, as desired or as the particular conditions may require.

Advantageously, the solid, film-forming alkaline-catalyzed organopolysiloxanes are made by a method which includes the step of preparing a prepolymer that is a product of conjoint hydrolysis and condensation of a propyltrimethoxy silane (i.e., n-propyl- or isopropyltrimethoxy silane, and preferably the n-propyl derivative) to form a siloxane partial condensation product, by heating at the reflux temperature of the reaction mass a solution containing the following ingredients in the stated molar ratios:

| | Molar ratio |
|---|---|
| A propyltrimethoxy silane | 1.0 |
| Water | 2.0–24.0 |
| Hydroxide, carbonate or bicarbonate of an alkali-metal having an atomic number above 3 | 0.01–0.3 |
| Methanol | 0–100 |

The solid prepolymers are believed to have a fairly ordered structure with perhaps some cross-linking. The prepolymer is an almost completely hydrolyzed and condensed siloxane, which contains a small amount of silanolate end groups.

The heat-treatment, preferably under vacuum, is believed to effect a thermal rearrangement of the prepolymer molecules. This rearrangement is catalyzed by the aforementioned silanloate end groups and/or by small amounts of basic catalyst which may have become physically incorporated in the prepolymer. From Nmr, IR, molecular weight and solubility data, it is believed that the final polymer has a linear, double-chain structure.

Example 1

Fifty (50) ml. of methanol, 18.0 g. of distilled water (1 mole) and 0.7 g. (0.0125 mole) of KOH in pellet form are added, with stirring, to 20.5 g. (0.125 mole) of n-propyltrimethoxy silane (90–100% pure). The catalyst is added last. The resulting solution is initially clear or slightly cloudy, but a precipitate rapidly forms when heating is begun. The mixture is brought to reflux temperature and heated under reflux, with stirring, for 2 hours.

At the end of the reflux period the solid siloxane prepolymer is isolated by any suitable means, e.g., by suction filtration. After washing thoroughly with a solvent, specifically methanol, it is air-dried. The remainder of the methanol is removed by drying in a vacuum oven at 20° to 50° C. for at least 2 hours. The product is a white, waxy solid. Yield: 11–13 g.; M.P. 280°–300° C.

If the prepolymer is caked in the form of large lumps at the end of the drying period, it is usually pulverized, rewashed with methanol and again dried as above described.

This example illustrates preparation of one of the starting materials of the invention—an alkaline-catalyzed prepolymer.

Example 2

This example illustrates the preparation of a suitable alkaline-catalyzed polymer starting material.

The prepolymer of Example 1 is heated under a reduced pressure of 1 mm. Hg to 300° C. at which temperature it melts. After cooling to room temperature under approximately the same reduced pressure, the resulting resinous, substantially completely condensed organopolysiloxane ($\overline{M}_n$ of approximately 10,000–13,000) is dissolved in an organic solvent, specifically benzene, to form a solution containing about 40% by weight of organopolysiloxane solids. (A small amount of acetic acid may be added to the solution to neutralize residual catalyst. However, better adhesion to substrates is obtained if neutralization is not effected.) The solution is filtered to remove insoluble material. The filtered solution may be used as a coating composition. For example, it can be poured on a substrate such as a glass plate and the benzene solvent allowed to evaporate in air at room temperature. A clear, colorless film that adheres tenaciously to the glass substrate is obtained. It is still clear and colorless when reheated to 250° C.

Alternatively, the polymer can be precipitated from the benzene solution by pouring the said solution very slowly into a large volume of vigorously stirred methanol. The white, fibrous polymer that precipitates is separated by, for instance, suction filtration, washed with methanol, and dried at ambient temperature in a vacuum oven. Yield, 60%.

Instead of using benzene as a solvent for the film-forming organopolysiloxane, one may use other organic solvents, e.g., other aromatic hydrocarbons such as toluene, xylene and the like; aliphatic hydrocarbons including for instance, heptane, octane, nonane, and mixtures thereof; polar solvents such as tetrahydrofuran, chlorinated hydrocarbons, etc.

Example 3

This example illustrates the preparation of an acid-catalyzed polymer starting material and a composition prepared from such a polymer and an alkaline-catalyzed polymer made from propyltrimethoxy silane.

An organopolysiloxane prepolymer was prepared by conjointly hydrolyzing and condensing a mixture of methyltriethoxy silane and phenyltriethoxy silane in which the mole ratio of the methyl silane to the phenyl silane was 2 : 1. Three moles of water was used per mole of silane monomer along with 2.5 parts by weight of HCl catalyst per million parts of silane-water reaction mixture. The reaction mixture was refluxed for 4 hours. Thereafter, alcohol was stripped off the batch until 60% of the alcohol byproduct and excess water was removed. The prepolymer was precured at a temperature of 140° C. for 30 seconds and thereafter cooled to 80 to 110° C. with stirring. The resultant material containing about 60% solids in ethyl alcohol was cooled. Forty grams of the polysiloxane solution was dissolved in 100 ml. of benzene and the solution was washed free of acid in a separatory funnel using three 40 ml. portions of distilled water.

The benzene was stripped from the solution in the original 250 ml. beaker and the resin heated to 100° C.

Thereafter, 0.24 gram of finely divided propyl prepolymer (prepared by conjointly hydrolyzing and condensing propyltriethoxy silane with an alkaline catalyst as described in Example 1) was slowly added to the polysiloxane and heating continued.

When the temperature reached 120–125° C., the viscous resin mixture was poured into an aluminum pan to form a disc. The viscous mixture solidified to form a solid disc that was cured at 90° C. for seven days. Glassy, hard chemical resistant and heat resistant discs were obtained.

Example 4

The 60% solids solution of polysiloxane in ethanol described in Example 3 was heated momentarily to 140° C. and then cooled to 110° C. The precured material (40 grams) was dissolved in 100 ml. of benzene.

The solution was washed free of acid with distilled water, 10 ml. of acetone being used to break up the emulsion that formed. The solution was stripped of 53 ml. of benzene and cooled to room temperature.

Thereafter 0.3 g. of the propyl polymer (prepared as described in Example 1) was dissolved in 10 ml. of benzene and mixed with the polysiloxane solution. The resultant polymer, having 0.75 part by weight of propyl polymer per 100 parts by weight of polysiloxane, was heated to 120° C. until it became viscous.

A small amount of the viscous material was poured onto a flat glass plate to form a coating. The resultant material was cured at 90° C. for three days. A clear, hard, acetone-resistant and heat-resistant coating was obtained.

Aluminum and copper panels were also coated with the above described viscous mixture of propyl polymer and polysiloxane, the coatings being cured at 90° C. for two days. Clear coatings were obtained on each of the aluminum and copper panels, the coatings also being hard and acetone-resistant.

Example 5

A finely powdered mixture was prepared by mixing in a mortar. The mixture contained 50% by weight of propyl prepolymer powder and 50% by weight of a polysiloxane powder, the propyl prepolymer being prepared as described in Example 1 and the polysiloxane powder being prepared from the precured solution described in Example 3, the precured solution being cooled to room temperature to form a solid which was then powdered to provide the starting material of this example.

Four grams of the powdered mixture was pressed between aluminum foils and a spacer at 440° F. at 16,000 pounds of pressure for one hour.

An opaque film was prepared that was hard and acetone resistant.

Example 6

A powdered organopolysiloxane was obtained from the precured solution described in Example 3 by dissolving the solution in benzene, washing to remove acid, evaporating to reduce the total volume and freeze drying the resultant solution.

Films were prepared from a mixture of the above described freeze-dry organopolysiloxane by mixing 50% by weight of the material with 50% by weight of powdered propyl prepolymer material prepared as described in Example 1 and pressing the resultant mixture. Films were also prepared from a 50—50% by weight mixture of the powdery propyl polymer material described in Example 1.

The resultant films were all hard, heat resistant and acetone resistant and were not as brittle as films made from the acid-catalyzed organopolysiloxane alone.

It is to be understood that in accordance with the patent statutes, various modifications of the compositions herein described and claimed may be made without departing from the scope and spirit of the invention.

What is claimed is:

1. A composition comprising
   (1) about 100 parts by weight of an organopolysiloxane prepared from an acid-catalyzed hydrolysis and condensation product of a trialkoxy silane monomer having the formula:

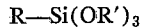
   R—Si(OR')$_3$ where R is an alkyl group of 1 to 2 carbon atoms or phenyl or mixtures thereof and R' is an alkoxy group of 1 to 6 carbon atoms and
   (2) about ½ to 300 parts by weight of an alkaline-catalyzed conjoint hydrolysis and condensation product of a propyltrialkoxy silane in which the alkoxy group has from 1 to 6 carbon atoms.

2. A composition as defined in claim 1 that is suitable for the preparation of coatings and films, the composition comprising about 33 to 300 parts by weight of said propyltrialkoxy silane.

3. A solid composition as defined in claim 1 in which the propyltrialkoxy silane is present in an amount of about ½ to 5 parts by weight.

4. A composition as defined in claim 1 in which the product of propyltrialkoxy silane is present in an amount of about 1 part by weight.

5. A composition as defined in claim 1 in which the product of propyltrialkoxy silane is a thermoplastic prepolymer.

6. A composition as defined in claim 1 in which the product of propyltrialkoxy silane is a polymer that is substantially completely condensed and formed by heating a thermoplastic prepolymer of said propyltrialkoxy silane.

7. A film-forming composition comprising
   (1) an organopolysiloxane prepared from the acid-catalyzed hydrolysis and condensation product of a hydrocarbon trialkoxy silane monomer in which the hydrocarbon is methyl or a mixture of methyl and phenyl and
   (2) a thermoplastic organopolysiloxane which is the autogenous siloxane condensation product of the hydrolysis of a propyltrimethoxy silane while dissolved in an aqueous methanol solution containing a catalytic amount of potassium hydroxide.

8. A composition as defined in claim 7 in which the hydrocarbon trialkoxy silane is methyltriethoxy silane.

9. A composition as defined in claim 7 in which the hydrocarbon trialkoxy silane is a mixture of methyltriethoxy silane and phenyltriethoxy silane.

References Cited

UNITED STATES PATENTS 2,927,909  3/1960  Lyons et al. _____ 260—825

SAMUEL H. BLECH, *Primary Examiner.*

U.S. Cl. X.R.

117—124, 132, 161; 260—30.4, 33.4, 33.6, 33.8, 46.5